No. 685,625. Patented Oct. 29, 1901.
F. J. MANLEY.
FEED WATER HEATER AND PURIFIER.
(Application filed Dec. 31, 1900.)

(No Model.)

WITNESSES
George Kane
Roy McIntire

Frederick J. Manley
INVENTOR
by Connolly Bros
Attorneys

UNITED STATES PATENT OFFICE.

FREDERICK J. MANLEY, OF ALLEGHENY, PENNSYLVANIA.

FEED-WATER HEATER AND PURIFIER.

SPECIFICATION forming part of Letters Patent No. 685,625, dated October 29, 1901.

Application filed December 31, 1900. Serial No. 41,592. (No model.)

*To all whom it may concern:*

Be it known that I, FREDERICK J. MANLEY, a citizen of the United States, residing at Allegheny, in the county of Allegheny and State of Pennsylvania, have invented certain new and useful Improvements in Feed-Water Heaters and Purifiers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to that class of feed-water heaters for steam-boilers in which live steam is employed to heat the water passing through tubes, and has for its object the provision of novel means for purifying the water fed to the boiler by separating from it the oil taken up from the exhaust-steam in the open heater and such scale forming or sedimentary materials as may not have been deposited in the tubes of the live-steam heater.

My invention consists in the combination, with a heater in which live steam from the boiler is employed, of a filtering or separating chamber located between a heater and the boiler, said vessel containing a series of pans filled with gravel or other suitable oil-separating or filtering material and provided with spaces between said pans for the accumulation of oil and with means for drawing off said oil.

My invention further consists in the combination, with the heater, the separating or purifying vessel, and the boiler, of means for "blowing off" said vessel by the use of water from the boiler, all as hereinafter more particularly described.

Figure 1:
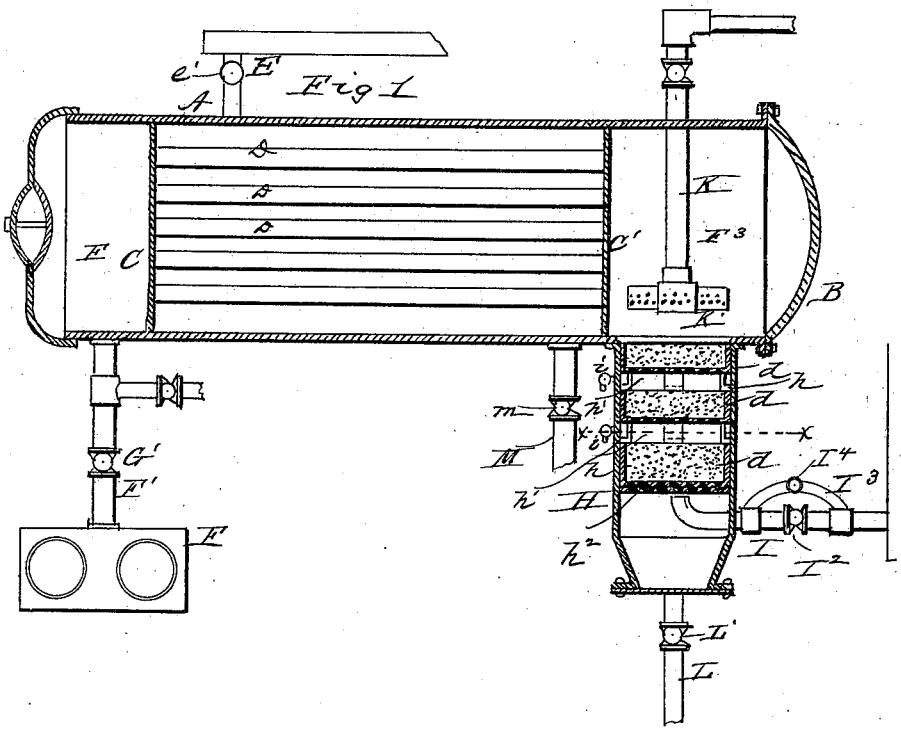
Figure 2:
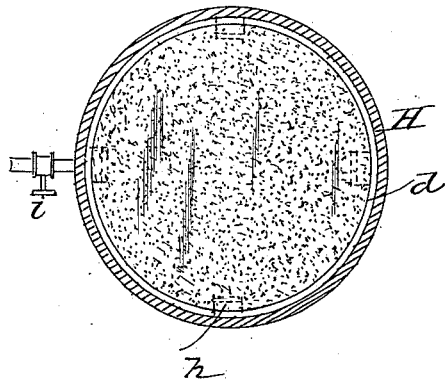

In the accompanying drawings, Figure 1 is a vertical longitudinal section of a feed-water heater and purifier embodying my invention. Fig. 2 is a horizontal section view of the purifier on the line $x\ x$ of Fig. 1.

A designates the casing or shell of the feed-water heater, and D D the water-tubes set in plates C C′, forming partitions in the casing and separating the water-spaces $F^2\ F^3$ at the ends of the casing from the live-steam space through which the water-tubes pass. Steam is admitted from the boiler into the space and around the tubes D through a pipe E′, provided with a valve $e$. The water from the open heater, wherein it is first heated by the exhaust-steam from the engine, is pumped into and through the heater-tubes D D by the pump F, from which leads a pipe F′, having a shut-off valve G′.

As the water heated in the open heater is mixed with a considerable quantity of cylinder-oil, which is carried off from the cylinders of the engine by the exhaust-steam and which should be separated from the water before it enters the boiler, I provide the separating apparatus or purifier, which constitutes herein the essential feature of my invention. This purifier or separator preferably consists of the vertically-arranged cylindrical vessel H, attached to the casing A at the bottom of the water-space $F^3$ and forming a continuation thereof. A pipe I, leading to the boiler, enters the vessel H horizontally near its lower end and is bent upward at the center of the vessel. A check-valve $I^2$, located on the pipe I, allows water from the heater to enter the boiler, but closes against back pressure from the boiler. The water heated in the tubes D passes to the boiler through the purifier, and in the latter are arranged a series of sieve-like pans $d\ d$, having woven-wire or perforated bottoms and containing gravel or other suitable material adapted to serve as separating or purifying bodies to separate from the water passing through them the oil and other foreign substances which it contains and which otherwise unfits it for admission to the boiler. These pans are vertically separated from each other and, with the exception of the lowest pan, provided with legs or supports $h\ h$, which rest on the rims or edges of the pan below. The lowest pan rests on a perforated plate $h^2$. The object in separating these pans is to provide spaces or chambers $h'\ h'$ for the accumulation of the oil which is taken from the water by the separating or purifying material, so as to allow the oil to be from time to time removed, for which purpose draw-off cocks $i\ i$ are fitted to the side of the vessel H on line with bottoms of the spaces $h'\ h'$.

The purifying or filtering material will not only take up oil from the water, but will also take up such scale-forming or sedimentary minerals as may not have been deposited in the heater. When the purifier and other parts of the apparatus become clogged, they may be blown off by the water from the boiler. For this purpose the pipe I, leading to the boiler, is provided with a by-pass I³ around the check-valve I², furnished with a valve I⁴, which when opened allows water to enter the vessel H. A pipe K enters the space D' above the vessel H, and extending down to near the top of said vessel is provided with a T connection K', perforated, as shown. This pipe is open at its upper end, and outside the casing A is provided with a valve k, which is closed when the pipe is not in use. Another pipe L, open at its lower end and provided with a valve L', is connected to the lower end of the vessel H. A pipe M, open at its outer end, is connected to the casing A near vessel H and furnished with a valve m.

When the heater is in active use, the valves g, k, L', m, and I⁴ are closed. When, however, it is desired to blow off the apparatus, these valves are opened and the valves on the water and steam inlet pipes closed. The valve I⁴ on the by-pass being opened, water is allowed to enter the vessel H through the pipe I³ and "blow off" the oil and other loose foreign matter which has accumulated in the gravel-pans and other parts of the apparatus, such material being blown through the various open pipes.

The gravel-pans may be removed for renewal by taking off the head B of the casing A, which will give access to the vessel H. The purifier or separator may be used without the tubular heater A and may be connected directly to the pump-pipe F'.

Having described my invention, what I claim, and desire to secure by Letters Patent, is—

1. The combination with a tubular feed-water heater, heated by live steam from a boiler a pump and an open heater, in which the water is heated by exhaust-steam from the engine, of a purifying vessel located between the live-steam heater and the boiler, and containing removable pans of porous oil-absorbing material and provided with cocks for drawing off the oil; a pipe leading from said vessel to the boiler and having a check-valve, a by-pass pipe communicating with the last-named pipe on opposite sides of the check-valve, and provided with an open-and-shut valve, and one or more valved blow-off pipes communicating with the water-chamber of the said tubular heater and with the purifying vessel, substantially as described.

2. The combination with a tubular feed-water heater, arranged and adapted to be heated by live steam of a purifying chamber or vessel communicating with the water-space of the heater, a pipe leading therefrom to the boiler, a series of removable pans containing gravel and other oil-absorbing material arranged within said vessel and having legs or supports by which said pans are separated, and cocks fitted to said vessel and communicating with the spaces between the gravel-pans, substantially as described.

3. The combination with the boiler and a supply-pipe leading from an open heater, of a purifier or separator consisting of a vessel containing one or more removable sieve-like pans of purifying or oil-separating material, and having one or more valved blow-off pipes, and cocks for the withdrawal of oil; a pipe leading from said purifier to the boiler provided with a check-valve, and a by-pass on said pipe leading around said check-valve and having the valve to open or close communicating with the boiler, substantially as described.

In testimony whereof I affix my signature in presence of two witnesses.

FREDERICK J. MANLEY.

Witnesses:
THOS. A. CONNOLLY,
JOHN GRAEBING, Jr.